US009265110B2

(12) United States Patent
Yang

(10) Patent No.: US 9,265,110 B2
(45) Date of Patent: Feb. 16, 2016

(54) LED POWER SUPPLY WITH SMALL DIMMING RATIO CONTROL AND CONTROL METHOD THEREOF

(71) Applicant: Chengdu Monolithic Power Systems Co., Ltd., Chengdu (CN)

(72) Inventor: Zhijiang Yang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/581,941

(22) Filed: Dec. 23, 2014

(65) Prior Publication Data

US 2015/0189706 A1 Jul. 2, 2015

(30) Foreign Application Priority Data

Dec. 26, 2013 (CN) .......................... 2013 1 0729551

(51) Int. Cl.
*H05B 33/08* (2006.01)
(52) U.S. Cl.
CPC .......... *H05B 33/083* (2013.01); *H05B 33/0815* (2013.01)
(58) Field of Classification Search
CPC ............... H05B 33/08; H05B 33/0815; H05B 33/0827; H05B 33/083; H05B 33/0848; H05B 33/0851; H05B 37/02

USPC .......... 315/185 R, 209 R, 224, 225, 291, 297, 315/307, 308
See application file for complete search history.

(56) References Cited

U.S. PATENT DOCUMENTS

| | | | |
|---|---|---|---|
| 2009/0167197 A1* | 7/2009 | Wang et al. ................ | 315/185 R |
| 2011/0194214 A1 | 8/2011 | Yao | |
| 2012/0104964 A1 | 5/2012 | Hughes | |
| 2012/0161639 A1* | 6/2012 | Lee et al. ....................... | 315/122 |
| 2013/0293154 A1 | 11/2013 | Kuang | |
| 2014/0097755 A1* | 4/2014 | Lee ............................... | 315/122 |

\* cited by examiner

*Primary Examiner* — Thai Pham
(74) *Attorney, Agent, or Firm* — Perkins Coie LLP

(57) ABSTRACT

A LED driving control circuit for controlling a power switch in a LED power supply includes: a feedback circuit coupled to a LED load and generating a feedback signal indicative of an output voltage of the LED power supply; an enabling circuit generating an enable signal according to the feedback signal, a first reference signal and a PWM dimming signal, wherein when the feedback signal is higher than the first reference signal, the enable signal synchronizes with the PWM dimming signal, and when the feedback signal is lower than the first reference signal, the duty cycle of the enable signal is higher than the duty cycle of the PWM dimming signal; and a feedback loop control circuit generating a control signal for controlling the power switch according to the feedback signal only when the enable signal is in an active state.

20 Claims, 8 Drawing Sheets

LED POWER SUPPLY WITH SMALL DIMMING RATIO CONTROL AND CONTROL METHOD THEREOF

CROSS-REFERENCE TO RELATED APPLICATION(S)

This application claims the benefit of CN application No. 201310729551.7, filed on Dec. 26, 2013, and incorporated herein by reference.

TECHNICAL FIELD

The present invention generally relates to electrical circuit, and more particularly relates to LED power supply and associated control method.

BACKGROUND

Along with the development of electronic devices, lighting emitting diode (LED) is widely used for its high light intensity, direct current (DC) driving ability, long life and environmental-friendness.

At present, LED power supply mainly has two dimming methods. One is silicon controlled rectifier (or called TRIAC) dimming and the other is pulse width modulation (PWM) dimming. Compared to TRIAC dimming, PWM dimming has the advantage of no LED shimming and thus is preferred.

In order to decrease power dissipation of the LED power supply with PWM dimming, PWM dimming signal is used to control both the LED and the power supply. When the LED is turned off, the power supply is also shut off by the PWM dimming signal. FIG. 1 illustrates a prior art LED power supply 10 with PWM dimming. As shown in FIG. 1, LED power supply 10 comprises a boost converter 101, a LED load 102, a feedback circuit 103, a feedback loop control circuit 104 and dimming switches S1, S2 and S3. Feedback loop control circuit 104 comprises a double loop control circuit, which receives a feedback signal VFB from the feedback circuit 103, a reference signal VREF and an inductor current sensing signal ISENSE from the boost converter 101, and a driving signal generator 105 of the feedback loop control circuit 104 generates a control signal CTRL which is used to control a power switch of the boost converter 101. When the PWM dimming signal transits from logic HIGH to logic LOW, dimming switches S1, S2 and S3 together with switch S4 in control circuit 103 are turned OFF, and driving signal generator 105 is disabled, in order to decrease the power dissipation and improve efficiency.

However, in applications with wide range of dimming ratio, the dimming ratio or called the duty cycle of the PWM dimming signal may be very small, and in one dimming cycle, the inductor current even is unable to increase from zero to the desired level, and thus the power supplied to the LED load is not high enough. If this situation maintains in a period, the output voltage of the converter will decrease and makes the LED load functions abnormally.

SUMMARY

In order to address at least one or some of the above deficiencies, embodiments of the present invention disclose several LED power supply systems, associated control circuits and control methods.

In one embodiment of the present invention, a LED power supply comprises: a converter having a power switch, the converter configured to generate an output voltage for supplying a LED load; a LED dimming circuit having a dimming switch, the dimming switch being turned ON and OFF by a PWM dimming signal; and a LED driving control circuit. The LED driving control circuit comprises: a feedback circuit coupled to the LED load, the feedback circuit configured to generate a feedback signal indicative of the output voltage; an enabling circuit coupled to the feedback circuit, the enabling circuit configured to generate an enable signal according to the feedback signal, a first reference signal and the PWM dimming signal; and a feedback loop control circuit coupled to the feedback circuit and the enabling circuit, the feedback loop control circuit configured to generate a control signal for controlling the power switch according to the feedback signal only when the enable signal is in an active state; when the feedback signal is higher than the first reference signal, the enable signal synchronizing with the PWM dimming signal, and when the feedback signal is lower than the first reference signal, the duty cycle of the enable signal being higher than the duty cycle of the PWM dimming signal.

In another embodiment of the present invention, an LED driving control circuit for controlling a LED power supply comprises: a feedback circuit coupled to the LED power supply, the feedback circuit configured to generate a feedback signal indicative of an output voltage of the LED power supply; an enabling circuit coupled to the feedback circuit, the enabling circuit configured to generate an enable signal according to the feedback signal, a first reference signal and a PWM dimming signal; and a feedback loop control circuit coupled to the feedback circuit, the feedback loop control circuit configured to generate a control signal for controlling ON and OFF of a power switch of the LED power supply according to the feedback signal and the enable signal; when the feedback signal is higher than the first reference signal, the enable signal synchronizing with the PWM dimming signal, and when the feedback signal is lower than the first reference signal, the duty cycle of the enable signal being higher than the duty cycle of the PWM dimming signal.

In yet another embodiment, a LED driving method comprises: generating a feedback signal indicative of an output voltage of a LED power supply; generating an enable signal based on the feedback signal, a first reference signal and a PWM dimming signal, wherein when the feedback signal is higher than the first reference signal, the enable signal synchronizes with the PWM dimming signal, and when the feedback signal is lower than the first reference signal, the duty cycle of the enable signal is larger than the duty cycle of the PWM dimming signal; and generating a control signal according to the feedback signal only when the enable signal is in an effective state, the control signal controlling a power switch of the LED power supply.

According to embodiments of the present invention, it is aimed to eliminate the over-low output voltage problem when the duty cycle of the dimming signal is too small in the prior art LED power supply.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" in the description may refer to direct connection or indirect connection via interim media. The interim media may include conductor which may has resistance, parasitic capacitance and/or parasitic inductance. The interim media may include diode or other component/circuit. The phrase "circuit" in the description may have forms of Integrated Circuit (IC), device, printed circuit board system or others.

Figure 2:
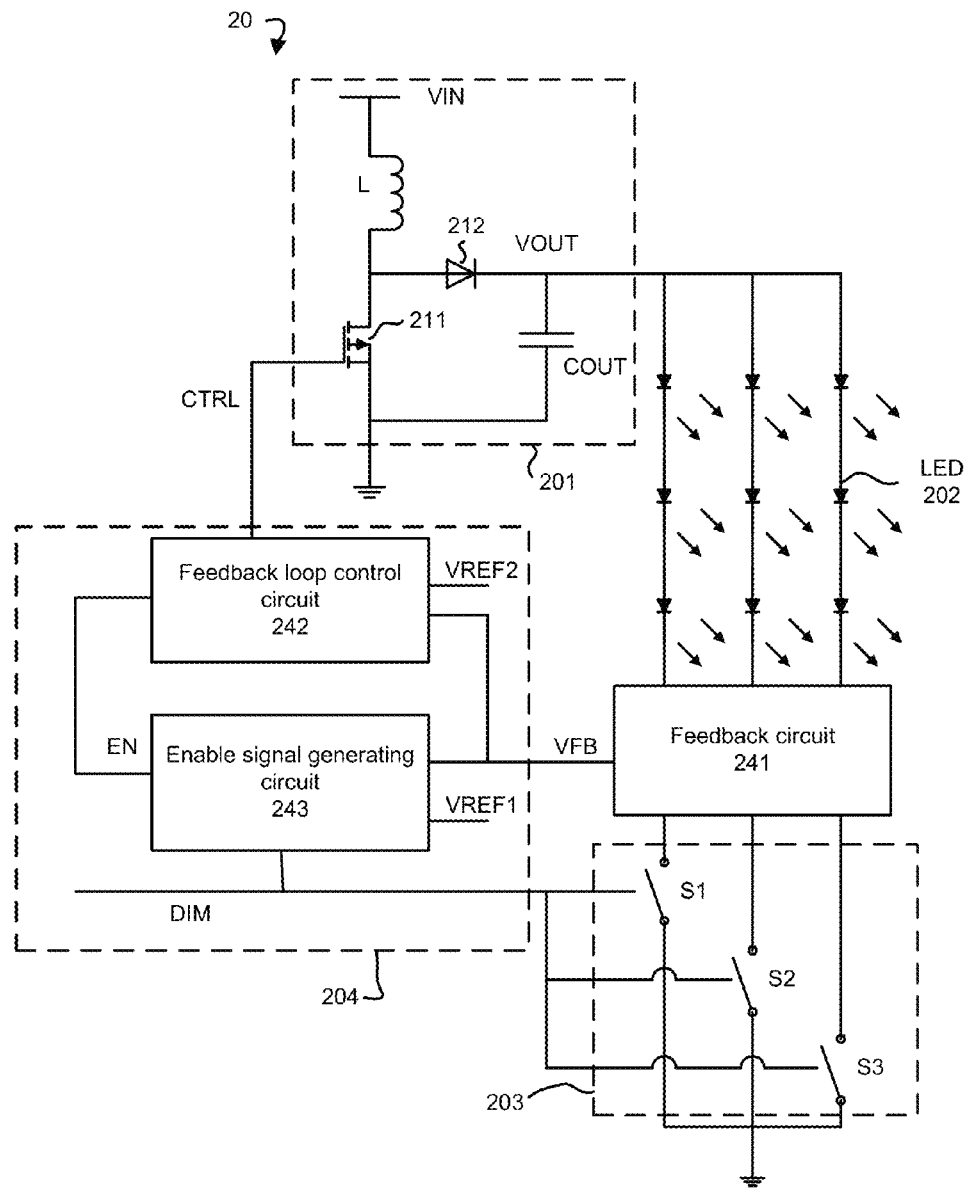
FIG. 2 illustrates a block diagram of a LED power supply 20 according to an embodiment of the present invention.

FIG. 2 illustrates a block diagram of LED power supply 20 according to an embodiment of the present invention. As shown in FIG. 2, LED power supply 20 comprises a converter 201 which has at least one power switch and supplies power to LED load 202. In the shown embodiment, converter 201 comprises a boost converter which has a primary power switch 211, an output inductor L, an output capacitor COUT and a rectifier 212. Rectifier 212 may be a diode (as shown in FIG. 2), or may be a synchronous rectifier. In other embodiments, converter 201 may comprise other suitable types of converters, such as buck converter, fly-back converter, resonating half-bridge converter and so on which has at least one power switch. Converter 201 receives an input voltage VIN, and converts it into an output voltage VOUT. In the shown embodiment, LED load 202 comprises 3 LED strings. LED load 202 is coupled to the output OUT of converter 201 for receiving the output voltage VOUT. In other embodiment, LED load 202 may comprise other number of LED strings or in other configurations.

LED power supply 20 further comprises a LED dimming circuit 203. LED dimming circuit 203 comprises a dimming switch. In the shown embodiment, LED dimming circuit 203 comprises 3 dimming switches S1, S2 and S3, which are coupled to the 3 LED strings respectively. A person of ordinary skill in the art will know that in other embodiments, the number or configuration of the dimming switches may have various examples, according to the different LED load. Dimming switch is turned ON and OFF by a dimming signal DIM.

Converter 201 is controlled by a LED driving control circuit 204 in the LED power supply 20. In the shown embodiment, LED driving control circuit 204 comprises a feedback circuit 241, a feedback loop control circuit 242 and an enabling circuit 243. Feedback circuit 241 is coupled to the LED load 202 and generates a feedback signal VFB. Enabling circuit 243 is coupled to the feedback circuit 241 and generates an enable signal EN according to the feedback signal VFB, a reference signal VREF1 and PWM dimming signal DIM. Feedback loop control circuit 242 is coupled to the feedback circuit 241, and generates a control signal CTRL according to the feedback signal VFB, a second reference signal VREF2 only when the enable signal EN is in an active state for example logic HIGH state. Control signal CTRL controls the ON and OFF states of the primary power switch 211 of converter 201. And when the enable signal EN is in an inactive state different from its active state, the control signal CTRL keeps the power switch 211 in OFF state.

When the system functions normally, the output voltage VOUT fluctuates in a normal range, which means that feedback signal VFB is higher than reference signal VREF1, and enable signal EN synchronizes with PWM dimming signal DIM. During the OFF state of the dimming switch, the feedback loop control circuit 242 is disabled in order to reduce power dissipation. "Normal range" in embodiments of the present invention refers to the normal output voltage range for a certain power supply system and varies with different systems. When output voltage VOUT is lower than the minimum limit of the normal range, which means that feedback signal VFB is lower than reference signal VREF1, the duty cycle of enable signal EN increases with the decrease of feedback signal VFB. Thus, when dimming switches S1-S3 are turned OFF, LED load 202 stops to consume power. However, converter 201 continues to have switching actions till enable signal EN transits to an ineffective state to turn OFF converter 201. Thus output capacitor COUT continues to be charged and draws output voltage VOUT back to normal range after LED load is cut off.

Figure 3:
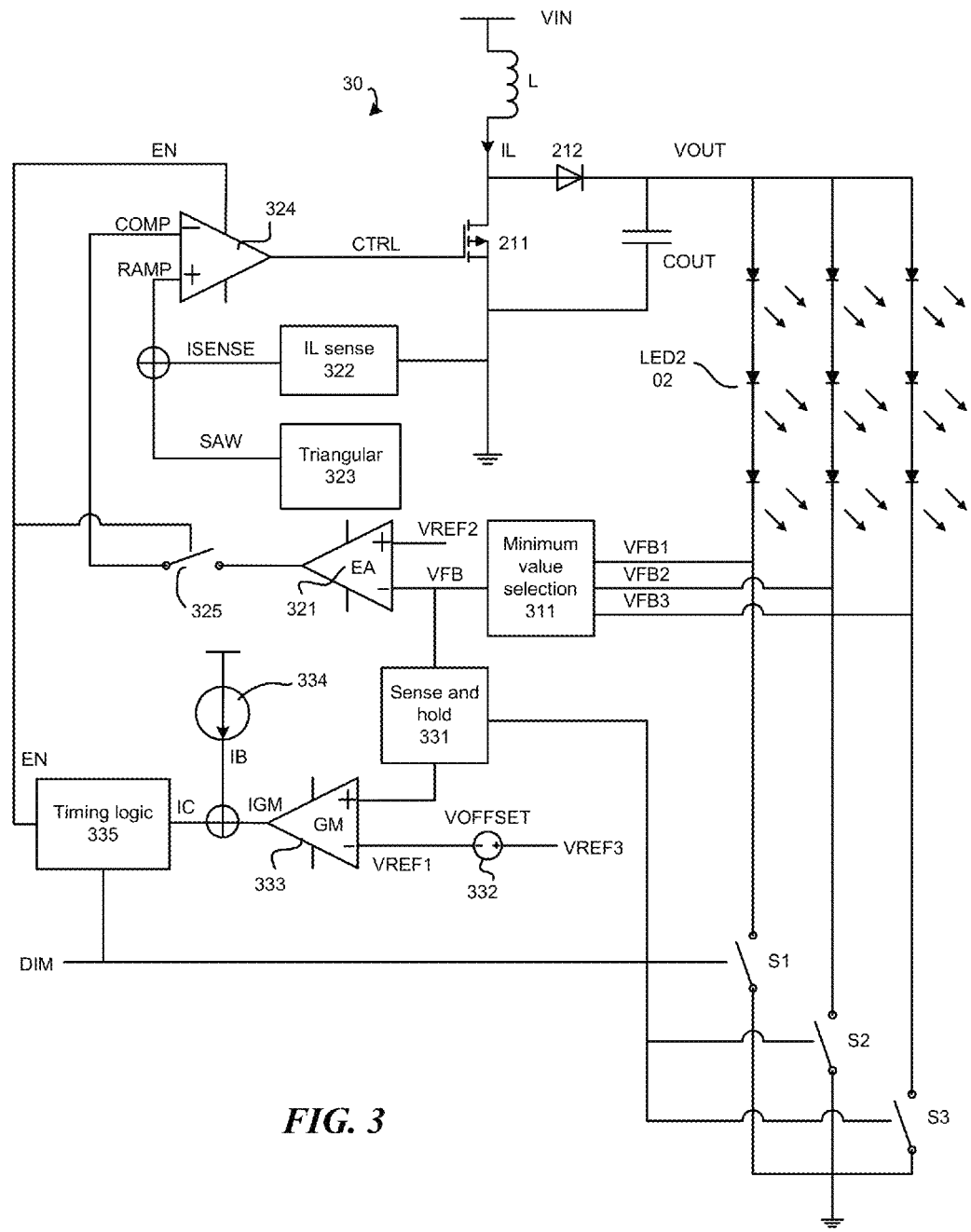
FIG. 3 illustrates a circuit diagram of a LED power supply 30 according to an embodiment of the present invention.

FIG. 3 illustrates a circuit diagram of LED power supply 30 according to an embodiment of the present invention. In this embodiment, feedback circuit 241 comprises a minimum value selection circuit 311 having an input coupled to the cathodes of three strings of LED load 202 to receive the feedback signals VFB1, VFB2 and VFB3 from LED strings. The minimum value selection circuit 311 selects the minimum value from signals VFB1, VFB2 and VFB3 and presents it as feedback signal VFB at its output. A person of ordinary skill in the art will know that in other embodiments, feedback circuit 241 may have other topologies to generate feedback signal VFB, for example, feedback signal VFB may be representative of the peak current value, the average value or the weighted average value of the feedback signals of the LED strings.

In the embodiment in FIG. 3, feedback loop control circuit 242 comprises a double loop control circuit which has an error amplifying circuit 321, a current sensing circuit 322, a triangular signal generating circuit 323, a control signal generating circuit 324 and an enable switch 325. Error amplifying circuit 321 has a non-inverting input receiving the second reference signal VREF2, an inverting input receiving feedback signal VFB and an output providing an error amplifying signal COMP. Current sensing circuit 322 senses the current IL flowing through inductor L of converter 201, and generates a current sensing signal ISENSE. Triangular signal generating circuit 323 generates a triangular signal SAW and is added with current sensing signal ISENSE to obtain a slope compensation signal RAMP. Control signal generating circuit 324 has a non-inverting input, an inverting input, an enable input and an output. Enable switch 325 is coupled between the output of error amplifying circuit 321 and the inverting input of control signal generating circuit 324. Error amplifying signal COMP is supplied to the inverting input of control signal generating circuit 324 via enable switch 325, and slope compensation signal RAMP is supplied to the non-inverting input of control signal generating circuit 324. Enable signal EN is supplied to the enable input of control signal generating circuit 324, and the output of control signal generating circuit 324 provides control signal CTRL according to error amplifying signal COMP, slope compensation signal RAMP and enable signal EN, in order to control power switch 211. Enable switch 325 is turned ON and OFF by enable signal EN.

A person of ordinary skill in the art should know that feedback loop control circuit 242 may be different from those in the above referred embodiment. In other embodiments, feedback loop control circuit 242 may use other suitable circuit for generating the PWM control signal. For example, in one embodiment, feedback loop control circuit 242 may comprise a voltage controlling converter.

In the shown embodiment, enabling circuit 243 comprises a sense and holding circuit 331, an optional biasing voltage source 332, a transconductance amplifier 333, a charging current generating circuit comprising a biasing current source 334 and a timing logic circuit 335. Sensing and holding circuit 331 receives feedback signal VFB and PWM dimming signal DIM, in order to sense feedback signal VFB when the dimming switches are in ON state, and hold the sensed value when the dimming switches are in OFF state. In one embodiment, sensing and holding circuit 331 senses the minimum value of feedback signal VFB during the ON state of dimming switches. In the shown embodiment, the optional biasing voltage source 332 comprises a DC biasing voltage VOFFSET, wherein the first reference signal VREF1 is the difference between a reference signal VREF3 and the biasing voltage VOFFSET. In one embodiment, VOFFSET is 100 mV. And in other embodiments, VOFFSET may have other suitable values, or may be the first reference signal VREF1 is not generated based on reference signal VREF3. Transconductance amplifier 333 has a non-inverting input, an inverting input and an output, wherein the non-inverting input is coupled to the output of the sensing and holding circuit 331 for receiving the sensed and held feedback signal VFB. The inverting input of transconductance amplifier 333 receives the first reference signal VREF1 and the output of the transconductance amplifier provides a transconductance amplified current IGM. The biasing current IB provided by biasing current source 334 is added with the transconductance amplified current IGM to obtain a charging current IC. This module may be called a charging current generating circuit which generates charging current IC based on the transconductance amplified current IGM. Timing logic circuit 335 receives PWM dimming signal DIM and charging current IC, and obtains a time signal indicative of a time period T, and enable signal EN is generated according to time period T and dimming signal DIM.

When output voltage VOUT fluctuates within the normal range, feedback signal VFB is higher than VREF1, the transconductance amplified current IGM is a source current and the charging current IC is higher than biasing current IB. This high charging current IC makes time period T less than the ON time of the dimming switch determined by dimming signal DIM. At this time, enable signal EN is determined by PWM dimming signal DIM, and enable signal EN synchronizes with dimming signal DIM.

When output voltage VOUT decreases below the normal range, feedback signal is less than VREF1, transconductance amplified current IGM is a sink current, and the charging current IC is less than biasing current IB. This low charging current IC makes time period T of timing logic circuit 355 longer than the ON period of dimming signal DIM. And the enabling time of enable signal EN is determined by time T, which controls converter 301 continue to work after dimming signal DIM turning OFF the dimming switches, thus output capacitor COUT continues to be charged and output voltage VOUT resumes to normal range within the enabling time.

In some embodiments, time period T can be set as having an upper limit and a lower limit. The upper limit is 5-10 times the switching cycle period of converter 201. In one embodiment, the lower limit is about 1 micro-second to 2 micro-second, such that the enabling time of enable signal EN is higher than the lower limit.

Figure 4:
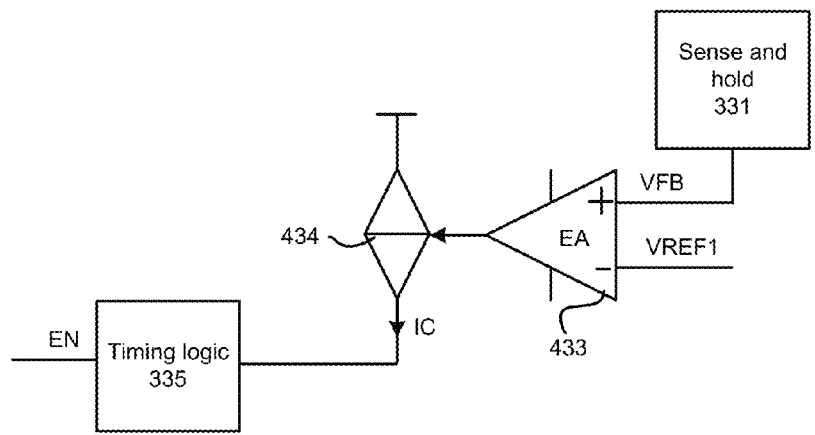
FIG. 4 illustrates a circuit diagram of an enabling circuit according to an embodiment of the present invention.
Figure 5:
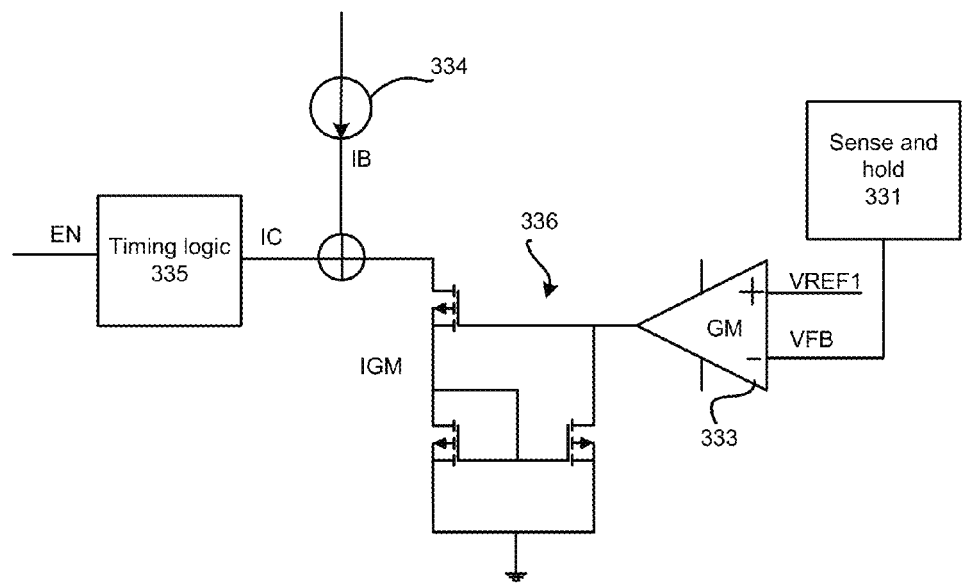
FIG. 5 illustrates a circuit diagram of another enabling circuit according to an embodiment of the present invention.

A person of ordinary skill in the art should know that in other embodiments, enabling circuit 242 may have different circuit configurations while having the same or similar function. For example, FIG. 4 and FIG. 5 each illustrate a circuit diagram of an enabling circuit 243 according to two embodiments of the present invention. In FIG. 4, feedback signal VFB and reference signal VREF1 are supplied to error amplifying circuit 433, and the output of error amplifying circuit 433 provides a current signal which is supplied to a control end of a charging current generating circuit comprising a current controlled current source 434. The current controlled current source 434 generates charging current IC according to the transconductance amplified current provided at the output of error amplifying circuit 433. In FIG. 5, charging current generating circuit of enabling circuit 243 further comprises a current mirror 336 which has a first current path and a second current path. Where transconductance amplifier 333 has the non-inverting input receiving reference signal VREF1, the inverting input coupled to the output of sensing and holding circuit 331 configured to receive feedback signal VFB. In the shown embodiment, the charging current generating circuit comprises a current mirror 336, a biasing current source 334 and an adder. Current mirror 336 comprises a Wilson current mirror. The output of transconductance amplifier 333 is coupled to the first current path of current mirror 336, configured to provide a current to the first current path. A biasing current source 334 provides a biasing current IB. The second current path of current mirror 336 provides transconductance amplified current IGM which is then added to biasing current IB to obtain charging current IC. In other embodiments, current mirror 336 may have other topologies. For example, current mirror 336 may comprise a current mirror having a first current path and the gates of two transistors coupled to the output of transconductance amplifier 333, and having a second current path providing a transconductance amplified current IGM.

Figure 6:
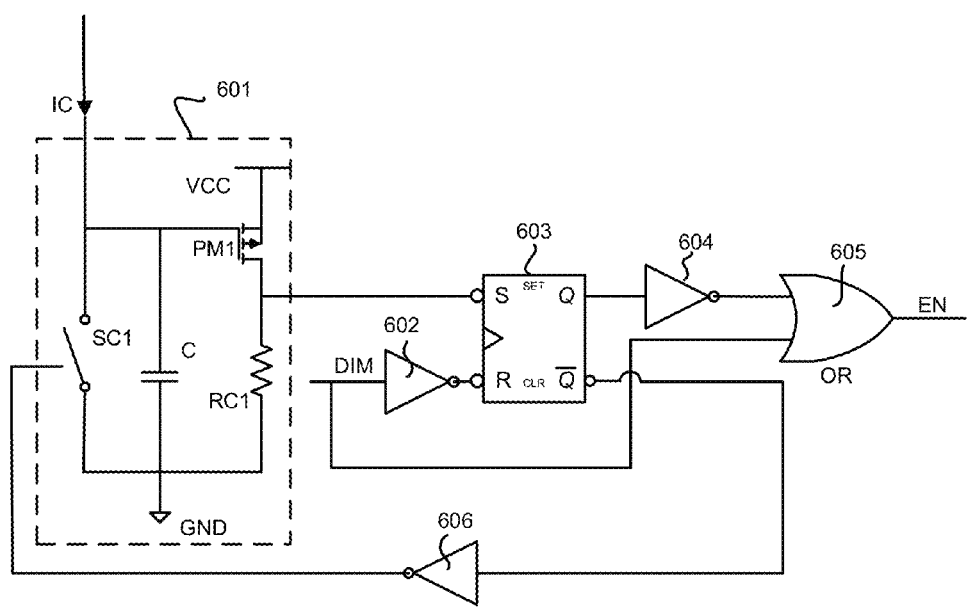
FIG. 6 illustrates a timing logic circuit according to an embodiment of the present invention.

FIG. 6 illustrates a timing logic circuit 335 according to an embodiment of the present invention. In this embodiment, timing logic circuit 335 comprises a timer 601, a first inverter 602, a flip latch 603, a second inverter 604, an OR gate 605 and a third inverter 606. Charging current IC flows into the input of timer 601. Timer 601 comprises a switch SC1, a charging capacitor C1, a P type metal oxide semiconductor field effect transistor (MOSFET) PM1 and a resistor RC1. Wherein switch SC1 is coupled in parallel with charging capacitor C1 between the input of timer 601 and reference ground GND. MOSFET PM1 has a gate coupled to the input of timer 601, a source coupled to a power source terminal VCC and a drain coupled to first end of resistor RC1, The other end of resistor RC1 is coupled to reference ground GND. And the drain of MOSFET PM1 forms the output of timer 601. The first inverter 602 has an input receiving dimming signal DIM. Flip latch 603 comprises an RS flip latch having two NAND gates. Wherein flop latch 603 has a set input S coupled to the output of timer 601, a reset input R coupled to the output of the first inverter 602, a first output Q coupled to the input of the second inverter 604 and a second output/Q coupled to the input of the third inverter 606. OR gate 605 has a first input coupled to the output of the second inverter 604, and a second input receiving dimming signal DIM. The output of the third inverter 606 is coupled to a control end of switch SC1 to control the ON and OFF of switch SC1. And the output of OR gate 605 provides enable signal EN.

At initial state, when dimming signal DIM transits from logic LOW to logic HIGH, OR gate 605 provides a logic HIGH enable signal EN, and feedback loop control circuit 242 is enabled. At the meantime, the reset input R is at a low voltage and the second output/Q provides a logic HIGH signal. The third inverter 606 provides a logic LOW signal to turn OFF switch SC1. Thus the gate of MOSFET PM1 is pulled down to zero voltage and PM1 is in ON state which pulls the voltage at the set input S of flip latch 603 at a HIGH level, Then charging current IC starts charging capacitor C and the time period T of timing logic circuit starts counting.

When the output voltage is in the normal range, IGM is a source current, and charging current IC is higher than the biasing current IB. Before dimming signal DIM transits from logic HIGH to logic LOW, the voltage at capacitor C has reached the off threshold voltage of MOSFET PM1, and PM1 is turned OFF. And the voltage at set input S transits from HIGH to LOW, and the output Q of flip latch 603 is set in logic HIGH state, and the first input of OR gate 605 is at logic LOW. Since dimming signal DIM is at logic HIGH, the output of OR gate 605 remains. At the meantime, the second output/Q of flip latch 603 is at logic LOW, and switch SC1 is turned ON. Thus time period T stops, and capacitor C discharges. Since the voltage across capacitor C decreases, MOSFET PM1 is turned ON again, and the voltage at set input S is HIGH again. When dimming signal DIM transits from logic HIGH to logic LOW, the inputs of OR gate 605 are both in logic LOW, and enable signal transits in logic LOW which disable feedback loop control circuit 242. Thus, the enabling time of enable signal EN is determined by dimming signal DIM, and is irrelevant to time period T.

When output voltage VOUT is lower than the minimum value of the normal range, transconductance amplified current IGM is negative, and charging current IC is less than biasing current IB. When PWM dimming signal DIM transits form logic HIGH to logic LOW, the small charging current IC would continue to make the voltage across capacitor C below the threshold voltage of MOSFET PM1. At this time, the voltage at reset input R of flip latch 603 transits from LOW to HIGH, the outputs of flip latch 603 remains the same, and enable signal remains in HIGH. When the voltage across capacitor C exceeds the threshold voltage of MOSFET PM1, PM1 is turned OFF. And the voltage at set input S turns LOW and time period T ends. At this time, the output Q of flip latch 603 is in logic HIGH, and the second output/Q of flip latch 603 is in logic LOW. Thus, both the two inputs of OR gate 605 are in logic LOW, and enable signal EN transits into logic LOW and disable feedback loop control circuit 242. At this situation, the enabling time of enable signal EN is determined by time period T.

A person of ordinary skill in the art would know that timing logic circuit 335 is not confined to the configuration shown in FIG. 6. In some embodiments, timing logic circuit 335 may have different configurations while having the same function with that in FIG. 6.

Figure 1:
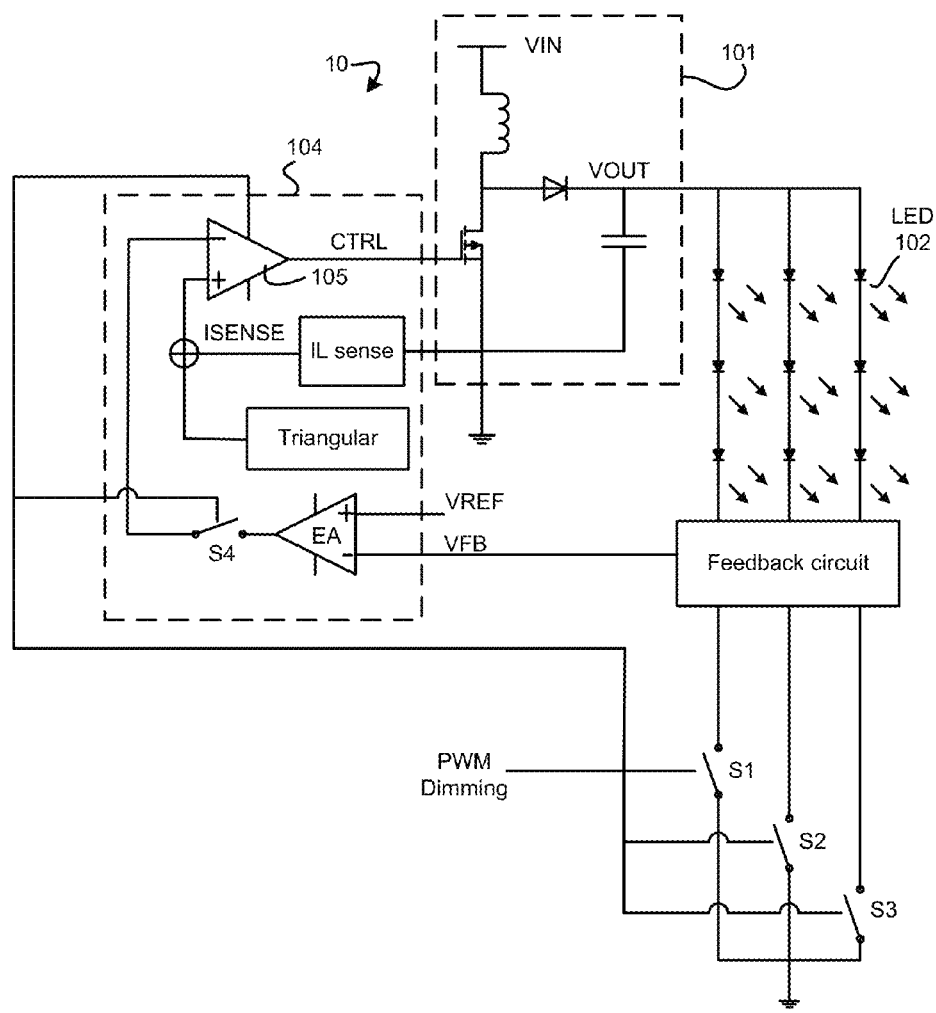
FIG. 1 illustrates a prior art LED power supply 10 with PWM dimming.
Figure 7A:
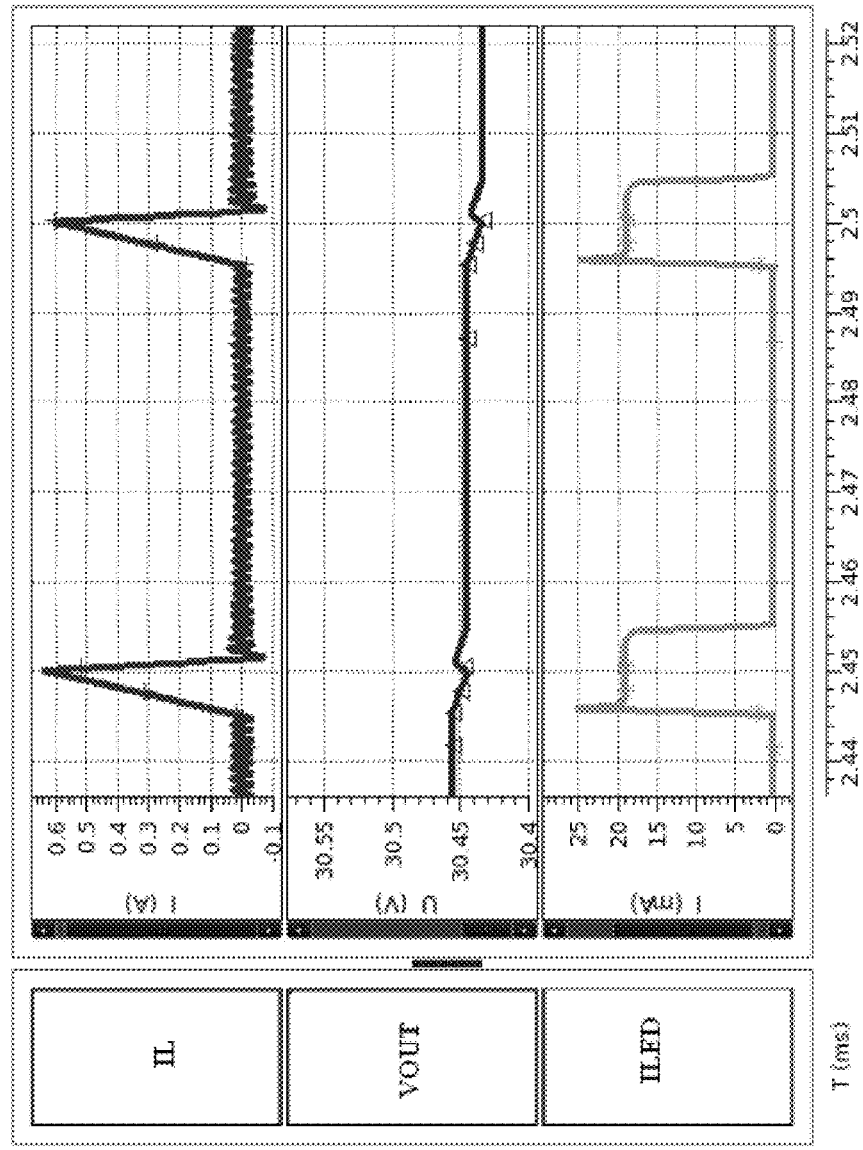
FIG. 7A illustrates a waveform diagram of signals in the prior art LED power supply 10.
Figure 7B:
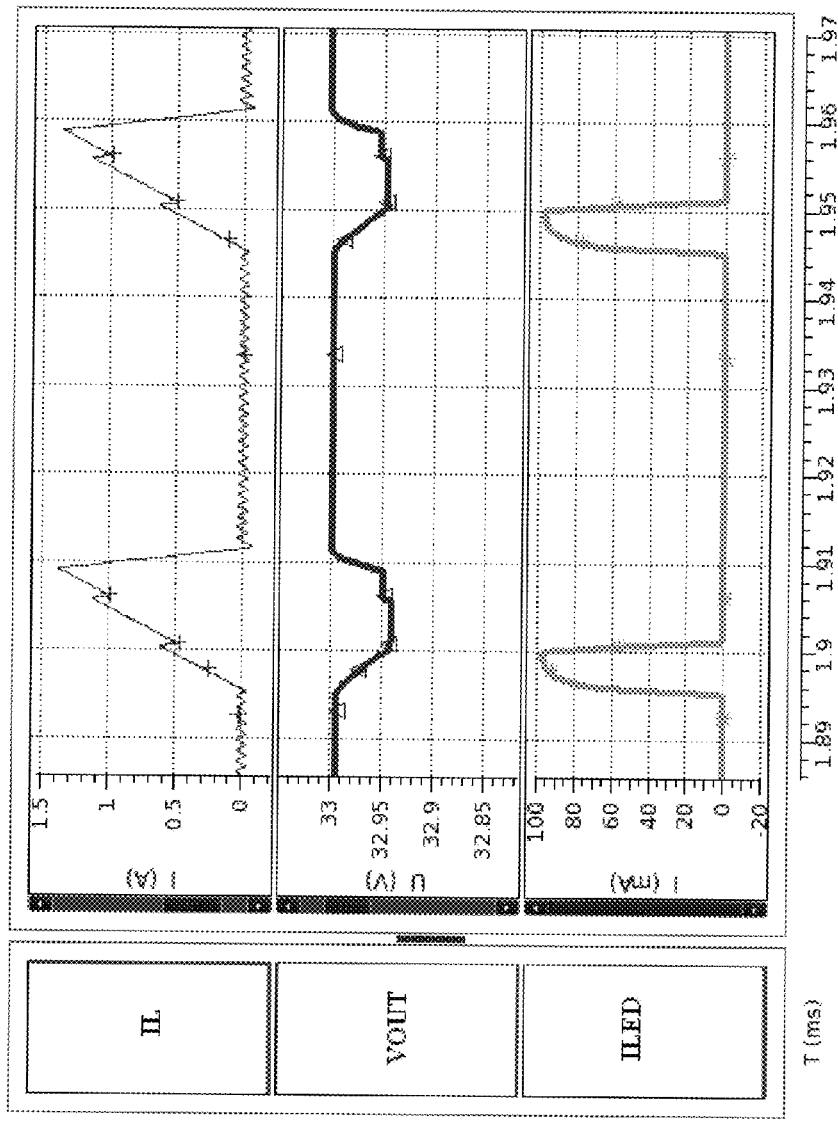
FIG. 7B illustrates a waveform diagram of signals in LED power supply 20 according to an embodiment of the present invention.

FIGS. 7A and 7B illustrates experimental waveform diagrams of signals shown in LED power supply 10 in FIG. 1 and in LED power supply 20 in FIG. 2 respectively for comparison. In this experiment, VIN=6V, L=47 uH, COUT=33 uF, ILED=100 mA for each LED string, the switching frequency FS=200 KHz, the duty cycle of PWM dimming signal is 10% and dimming frequency is 20 KHz.

Firstly referring to experimental waveforms in LED power supply 10. As shown in FIG. 7A, when the duty cycle of dimming signal DIM is 10%, in each enabling period of each cycle, inductor current IL can not reach the predetermined value, and thus can not provide enough power for supplying the output capacitor COUT and LED load. And output voltage VOUT decreases gradually and continuously. And the output current ILED is abnormally low and can not work normally.

FIG. 7B illustrates the experimental waveforms in LED power supply 20. As shown, the period of inductor current IL higher than zero is longer than that of output current ILED which indicates that enabling time is longer than on time period of dimming switches, and thus inductor current L would resume the normal value within the enabling time, and the output capacitor COUT and LED load can get enough power, and the system functions well.

Figure 8:
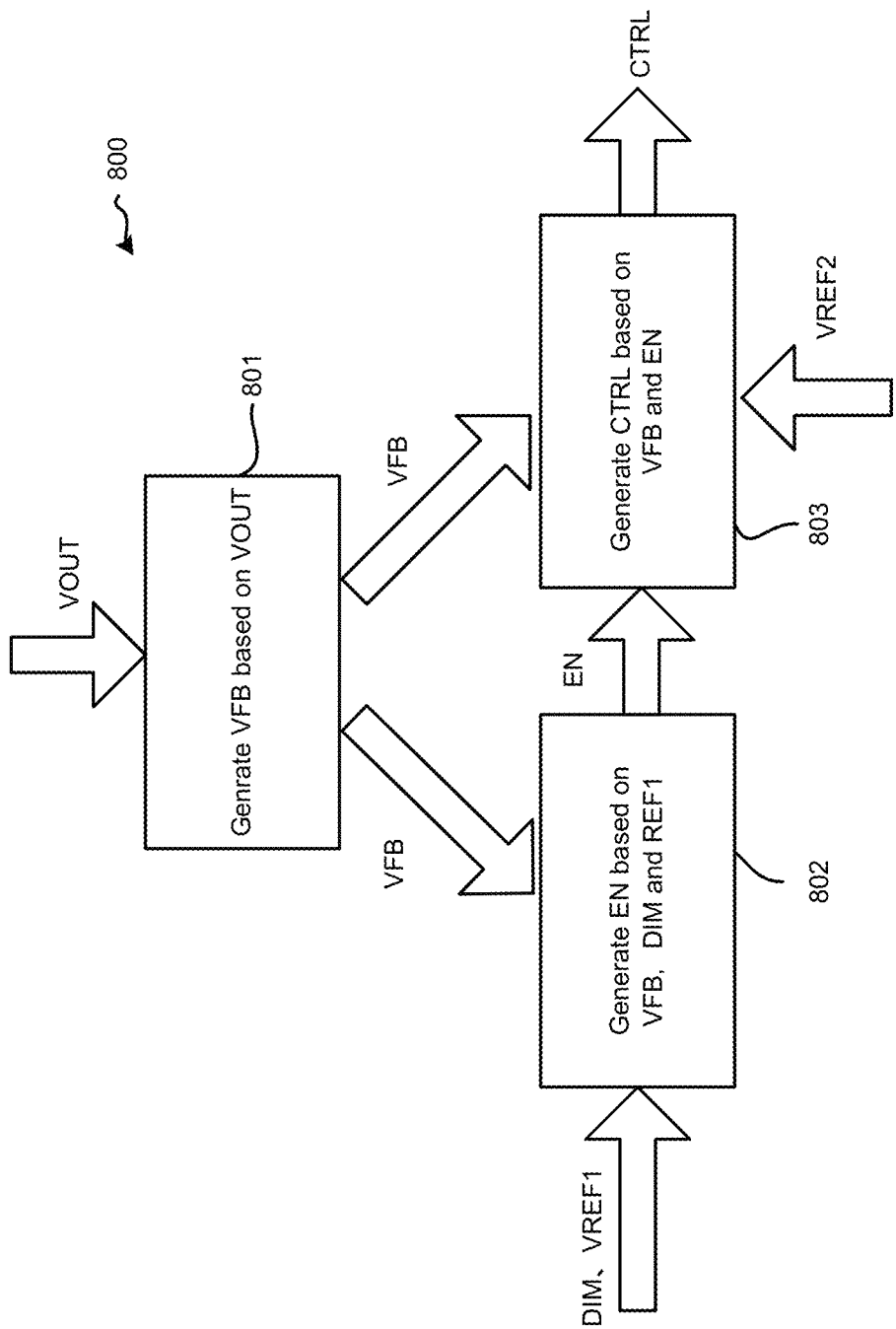
FIG. 8 illustrates a flow chart diagram of a control method for driving a LED power supply.

FIG. 8 illustrates a flow chart diagram of a control method 800 for driving LED power supply. The control method 800 comprises in step 801: generating a feedback signal VFB according to an output voltage VOUT; in step 802: generating an enable signal EN according to a PWM dimming signal DIM, feedback signal VFB and a first reference signal VREF1; in step 803: generating a control signal CTRL according to feedback signal VFB, a second reference signal VREF2 and enable signal EN; when output voltage VOUT is in the normal range, enable signal EN synchronizes with PWM dimming signal DIM, and when output voltage VOUT is below the minimum value of the normal range, the duty cycle of enable signal EN is higher than PWM dimming signal DIM.

In one embodiment, generating enable signal EN comprises: sensing feedback signal VFB when PWM dimming signal DIM is in its effective state for turning ON the dimming switch; generating a transconductance amplified current IGM according to feedback signal VFB and the first reference signal VREF1; generating a charging current IC by adding transconductance amplified current IGM and a biasing current IB; generating a time period T according to charging current IC, and providing enable signal EN according to time period T and PWM dimming signal DIM. Wherein, when feedback signal VFB is higher than the first reference signal VREF1, transconductance amplified current IGM is source current, and charging current IC is higher than biasing current IB. Accordingly time period T is less than the ON period of dimming signal DIM and the duty cycle of enable signal EN is determined by PWM dimming signal DIM. And if else feedback signal VFB is lower than the first reference signal VREF1, transconductance amplified current IGM is sink current, and charging current IC is lower than biasing current IB. Accordingly, time period T is longer than the ON period of PWM dimming signal DIM, and the duty cycle of enable signal EN is determined by time period.

In some embodiments, the first reference signal VREF1 equals the difference between a reference signal VREF3 and a biasing voltage VOFFSET. In one embodiment, VREF1=VREF3−100 mV.

In one embodiment, generating control signal CTRL further comprises: generating an error amplifying signal COMP according to feedback signal VFB and the second reference signal VREF2; sensing the inductor current and generating an inductor sensing signal ISENSE, and obtaining a slope compensation signal RAMP by adding the inductor sensing signal ISENSE and a triangular signal SAW; and generating control signal CTRL according to error amplifying signal COMP, slope compensation signal RAMP and enable signal EN.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A light emitting diode (LED) power supply comprising:
a converter having a power switch, the converter configured to generate an output voltage for supplying a LED load;
a LED dimming circuit having a dimming switch, the dimming switch being turned ON and OFF by a PWM dimming signal; and
a LED driving control circuit comprising:
a feedback circuit coupled to the LED load, the feedback circuit configured to generate a feedback signal indicative of the output voltage;
an enabling circuit coupled to the feedback circuit, the enabling circuit configured to generate an enable signal according to the feedback signal, a first reference signal and the PWM dimming signal; and
a feedback loop control circuit coupled to the feedback circuit and the enabling circuit, the feedback loop control circuit configured to generate a control signal for controlling the power switch according to the feedback signal only when the enable signal is in an active state;
when the feedback signal is higher than the first reference signal, the enable signal synchronizing with the PWM dimming signal, and when the feedback signal is lower than the first reference signal, the duty cycle of the enable signal being higher than the duty cycle of the PWM dimming signal.

2. The LED power supply of claim 1, wherein the enabling circuit comprises:
a sensing and holding circuit configured to receive the feedback signal and the PWM dimming signal, wherein when the PWM dimming signal turns ON the dimming switch, the sensing and holding circuit senses the feedback signal, and when the PWM dimming signal turns OFF the dimming switch, the sensing and holding circuit holds on the signal at an output of the sensing and holding circuit;
a transconductance amplifier having a non-inverting input, an inverting input and an output, wherein the non-inverting input is coupled to the output of the sensing and holding circuit, the inverting input is coupled to the first reference signal, and the output of the transconductance amplifier is configured to provide a transconductance amplified current;
a charging current generating circuit configured to generate a charging current based on the transconductance amplified current; and
a timing logic circuit configured to receive the PWM dimming signal and the charging current and generate a time signal indicative of a time period, wherein the enable signal is generated according to the time period and the PWM dimming signal.

3. The LED power supply of claim 2, wherein the first reference signal is a difference between a second reference signal and a biasing voltage.

4. The LED power supply of claim 2, wherein the time period has a lower limit and an upper limit.

5. The LED power supply of claim 4, wherein the upper limit is 5 to 10 times of a switching cycle period of the LED power supply.

6. The power supply of claim 4, wherein the lower limit is about 1 micro-second to 2 micro-second.

7. The LED power supply of claim 2, wherein the timing logic circuit comprises:
a timing circuit having an input configured to receive the charging current, the timing circuit comprising a switch, a charging capacitor, a PMOS and a resistor, wherein the switch of the timing circuit is coupled in parallel with the charging capacitor between an input of the timing circuit and a reference ground, the input of the timing circuit is further coupled to a gate of the PMOS, a source of the PMOS is coupled to a power source, a drain of the PMOS is coupled to a first end of the resistor, and a second end of the resistor is coupled to the reference ground, and wherein the drain of the PMOS functions as an output of the timing circuit;
a first inverter having an input configured to receive the PWM dimming signal;
an RS flip latch comprising two NOR gates, the RS flip latch having a setting input, a resetting input, a first output and a second output, wherein the setting input is coupled to the output of the timing circuit, the resetting input of the RS flip latch is coupled to the output of the first inverter;
a second inverter having an input coupled to the first output of the RS flip latch;
a third inverter having an input coupled to the second output of the RS flip latch, and an output configured to control ON and OFF of the switch of the timing circuit; and
an OR gate having a first input coupled to the output of the second inverter, a second input configured to receive the PWM dimming signal, and an output configured to provide the enable signal.

8. The LED power supply of claim 2, wherein the charging current generating circuit comprises a biasing current source configured to provide a biasing current, and further wherein the charging current generating circuit is configured to add the biasing current with the transconductance amplified current to obtain the charging current.

9. The LED power supply of claim 2, wherein the charging current generating circuit comprises a current controlled current source, wherein the current controlled current source is configured to be controlled by the transconductance amplified current and generate the charging current.

10. The LED power supply of claim 2, wherein the charging current generating circuit comprises:
a current mirror having a first current path and a second current path, wherein the first current path is coupled to the output of the transconductance amplifier; and
a biasing current source providing a biasing current;

wherein the charging current generating circuit is configured to add the biasing current to the current provided by the second current path of the current mirror in order to obtain the charging current.

11. The LED power supply of claim 1, wherein the feedback loop control circuit comprises:
   an error amplifying circuit having a non-inverting input, an inverting input and an output, wherein the non-inverting input receives a second reference signal, the inverting input receives the feedback signal and the output provides an error amplifying signal;
   a current sensing circuit configured to sense an inductor current of the converter and generate a current sensing signal;
   a triangular signal generating circuit configured to generate a triangular signal, wherein the triangular signal is added with the current sensing signal to obtain a slope compensation signal;
   a control signal generating circuit having a non-inverting input, an inverting input, an enable input and an output, wherein the non-inverting input of the control signal generating circuit is configured to receive the slope compensation signal, the inverting input of the control signal generating circuit is configured to receive the error amplifying signal, the enable input is configured to receive the enable signal and the control signal generating circuit is configured to generate a control signal at the output of the control signal generating circuit according to the error amplifying signal, the slope compensation signal and the enable signal; and
   an enable switch coupled between the output of the error amplifying circuit and the inverting input of the control signal generating circuit, wherein the enable switch is controlled by the enable signal.

12. A light emitting diode (LED) driving control circuit for controlling a LED power supply, the control circuit comprising:
   a feedback circuit coupled to the LED power supply, the feedback circuit configured to generate a feedback signal indicative of an output voltage of the LED power supply;
   an enabling circuit coupled to the feedback circuit, the enabling circuit configured to generate an enable signal according to the feedback signal, a first reference signal and a PWM dimming signal; and
   a feedback loop control circuit coupled to the feedback circuit, the feedback loop control circuit configured to generate a control signal for controlling ON and OFF of a power switch of the LED power supply according to the feedback signal and the enable signal;
   when the feedback signal is higher than the first reference signal, the enable signal synchronizing with the PWM dimming signal, and when the feedback signal is lower than the first reference signal, the duty cycle of the enable signal being higher than the duty cycle of the PWM dimming signal.

13. The LED driving control circuit according to claim 11, wherein the enabling circuit comprises:
   a sensing and holding circuit configured to receive the feedback signal and the PWM dimming signal, wherein when the PWM dimming signal is configured to turn ON a dimming switch, the sensing and holding circuit senses the feedback signal, and when the PWM dimming signal turns OFF the dimming switch, the sensing and holding circuit holds on the signal at an output of the sensing and holding circuit;
   a transconductance amplifier having a non-inverting input, an inverting input and an output, wherein the non-inverting input is coupled to the output of the sensing and holding circuit, the inverting input is coupled to the first reference signal, and the output of the transconductance amplifier is configured to provide a transconductance amplified current;
   a biasing current source configured to provide a biasing current, the biasing current added to the conductance amplified current to obtain a charging current; and
   a timing logic circuit configured to receive the PWM dimming signal and the charging current, the timing logic circuit configured to generate a time signal indicative of a time period, wherein the enable signal is generated according to the time period and the PWM dimming signal.

14. The LED driving control circuit according to claim 13, wherein the timing logic circuit comprises:
   a timing circuit having an input configured to receive the charging current, the timing circuit having a switch, a charging capacitor, a PMOS and a resistor, wherein the switch of the timing circuit is coupled in parallel with the charging capacitor between an input of the timing circuit and a reference ground, the input of the timing circuit is further coupled to a gate of the PMOS, a source of the PMOS is coupled to a power source, a drain of the PMOS is coupled to a first end of the resistor, and a second end of the resistor is coupled to the reference ground, and wherein the drain of the PMOS functions as an output of the timing circuit;
   a first inverter having an input configured to receive the PWM dimming signal;
   an RS flip latch comprising two NOR gates, the RS flip latch having a setting input, a resetting input, a first output and a second output, wherein the setting input is coupled to the output of the timing circuit, the resetting input of the RS flip latch is coupled to the output of the first inverter;
   a second inverter having an input coupled to the first output of the RS flip latch;
   a third inverter having an input coupled to the second output of the RS flip latch, and an output configured to control ON and OFF of the switch of the timing circuit; and
   an OR gate having a first input coupled to the output of the second inverter, a second input configured to receive the PWM dimming signal, and an output configured to provide the enable signal.

15. The LED driving control circuit according to claim 12, wherein the first reference is a difference between a second reference signal and a biasing voltage.

16. A light emitting diode (LED) driving method comprising:
   generating a feedback signal indicative of an output voltage of a LED power supply;
   generating an enable signal based on the feedback signal, a first reference signal and a PWM dimming signal, wherein when the feedback signal is higher than the first reference signal, the enable signal synchronizes with the PWM dimming signal, and when the feedback signal is lower than the first reference signal, the duty cycle of the enable signal is larger than the duty cycle of the PWM dimming signal; and
   generating a control signal according to the feedback signal only when the enable signal is in an effective state, the control signal controlling a power switch of the LED power supply.

17. The LED driving method of claim 16, wherein generating the enable signal comprises:
  when the PWM dimming signal turns ON a dimming switch, sensing the output voltage for generating the feedback signal and when the PWM dimming signal turns OFF the dimming switch, holding on the feedback signal;
  generating a transconductance amplified current via comparing the feedback signal with the first reference signal;
  generating a charging current by adding the charging current with a biasing current;
  generating a time signal indicative of a time period according to the charging current; and
  generating the enable signal according to the time period and the PWM dimming signal.

18. The LED driving method according to claim 17, wherein when the time period is shorter than the ON period of the dimming switch, the duty cycle of the enable signal is determined by the PWM dimming signal, and when the time period is longer than the ON period of the dimming switch, the duty cycle of the enable signal is determined by the time period.

19. The LED driving method of claim 17, wherein when the feedback signal is higher than the first reference signal, the transconductance amplified current is source current, and when the feedback signal is lower than the first reference signal, the transconductance amplified current is sink current.

20. The LED driving method of claim 1, wherein generating the control signal comprises:
  generating an error amplifying signal by amplifying the difference between the feedback signal and a second reference signal;
  obtaining a current sensing signal by sensing an inductor current of the LED power supply;
  obtaining a slope compensation signal by adding the current sensing signal to a triangular signal; and
  generating the control signal according to the error amplifying signal and the slope compensation signal only when the enable signal is in an active state.

* * * * *